(12) United States Patent
Corkery

(10) Patent No.: US 6,631,263 B1
(45) Date of Patent: Oct. 7, 2003

(54) CELL HAND-OFF BORDER IDENTIFICATION USING MS POSITIONING AND SIGNAL STRENGTH VALUES

(75) Inventor: Eric Corkery, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/186,623

(22) Filed: Nov. 6, 1998

(51) Int. Cl.7 .................................................. H04Q 7/20
(52) U.S. Cl. ........................ 455/436; 455/440; 455/446; 455/67.7
(58) Field of Search ................................ 455/436, 437, 455/438, 439, 440, 443, 442, 441, 421, 446, 67.7; 370/331, 329; 379/60, 59

(56) References Cited

U.S. PATENT DOCUMENTS

| 5,095,500 | A | * | 3/1992 | Tayloe et al. | ............... 455/446 |
| 5,432,842 | A | * | 7/1995 | Kinoshita et al. | ........... 455/440 |
| 5,561,841 | A | * | 10/1996 | Markus | ...................... 455/446 |
| 5,613,205 | A | * | 3/1997 | Dufour | ........................ 455/440 |
| 5,669,061 | A | * | 9/1997 | Schipper | ..................... 455/429 |
| 5,758,264 | A | * | 5/1998 | Bonta | ........................ 455/67.7 |
| 5,768,267 | A | * | 6/1998 | Raith | .......................... 370/329 |
| 5,867,785 | A | * | 2/1999 | Averbuch | .................... 455/436 |
| 5,999,813 | A | * | 12/1999 | Lu | ............................... 455/435 |
| 6,006,089 | A | * | 12/1999 | Sasaki | ......................... 455/423 |
| 6,038,444 | A | * | 3/2000 | Schipper | ..................... 455/421 |
| 6,061,337 | A | * | 5/2000 | Light | .......................... 370/331 |
| 6,167,277 | A | * | 12/2000 | Kawamoto | .................. 455/457 |
| 6,314,295 | B1 | * | 11/2001 | Kawamoto | ............... 455/456.2 |
| 6,321,090 | B1 | * | 11/2001 | Soliman | ..................... 455/440 |

* cited by examiner

Primary Examiner—Nay Maung
Assistant Examiner—John J Lee

(57) ABSTRACT

A method and system for generating a map of cell hand-off borders in a radiocommunications network uses a hand-off learning and recording technique that automatically identifies and stores the locations of mobile stations in the network when hand-off requests are initiated. Over a sufficient period of time, a compilation of stored location data associated with the mobile station hand-off requests will represent a complete "picture" of the ingoing and outgoing hand-off borders for every cell in the network.

20 Claims, 3 Drawing Sheets

CELL HAND-OFF BORDER IDENTIFICATION USING MS POSITIONING AND SIGNAL STRENGTH VALUES

This application is related to U.S. patent application Ser. No. 09/186,886 entitled "Poor Network Coverage Mapping," filed Nov. 6, 1998, U.S. patent application Ser. No. 09/186,614, entitled "Use of Mobile Station Positioning in Hand-Off," filed Nov. 6, 1998; and U.S. patent application Ser. No. 09/186,624 entitled "Use of Mobile Locating and Power Control for Radio Network Optimization," filed Nov. 6, 1998, the disclosures of which are expressly incorporated herein by reference.

BACKGROUND

Cellular communication systems conventionally consist of a plurality of base stations arranged in a pattern so as to define a plurality of overlapping cells which provide radio-commnunication support in a geographic area. A remote transmitter/receiver unit communicates with the base station of the corresponding cell in which the remote unit resides. This communication typically occurs through a channel assigned to the connection by the system. When the remote unit is mobile, or when the base station is non-stationary (i.e., an orbiting satellite), the remote unit may transition between adjacent cells due to the relative movement between the remote unit and the base station. Absent some intervention by the system, this transitioning would eventually terminate the connection because the received signal strength associated with the signals would diminish to a level where either the base station or remote station cannot adequately receive the other's transmissions to decode information associated therewith. Transitioning between cells can additionally cause a significant degradation in signal quality. This signal quality degradation is typically measured at the mobile station by a quality measure such as bit error rate (BER). Signal quality degradation and termination of communication due to inadequate signal strength represent aspects of the cell transition problem in mobile cellular communications.

A solution to this aspect of the cell transition problem is commonly called "handover." This conventional technique "hands off" an in-process communication with a remote unit from one base station in a first cell to another base station in another cell. This hand-off process maintains the quality and continuity of the connection and prevents the termination of the call when the mobile station is moving from one cell to another. The hand-off process may be accomplished using a number of system dependent methods. In existing analog systems, for example, a serving base station determines the need for a handoff of a mobile station whose connection it is handling based on periodic measurements of the signal strength and/or signal quality of the uplink voice channel signals received from that mobile station. If the measured signal strength and/or signal quality is below a predetermined level, the serving base station sends a hand-off request to the mobile switching center. The mobile switching center queries neighboring base stations for reports of the previously measured signal strength of signals on the voice channel currently being used by the mobile station. The mobile switching center then selects the target candidate cell associated with the neighboring base station reporting the strongest signal, provided that the reported signal strength is above a threshold, and transmits appropriate commands to that neighboring base station and to the mobile station via the serving base station to implement the handoff on the same or a different traffic channel.

In digital or dual-mode systems, as specified for example in the EIA/TIA IS-136 standard, hand-off from a digital traffic channel may also be implemented using a Mobile-Assisted Handoff (MAHO) procedure. Using this procedure, a mobile station may be ordered by the network to measure and report signal strength and/or other parameters of digital radio channels emitted by the serving base station, as well as those emitted by neighbor base stations. This enables hand-off decisions made by the network to be based not only on the measured signal strength and other parameters of the uplink signal received from the mobile station, but also on the downlink signal parameters detected by the mobile station on channels associated with the serving and neighbor base stations.

Additionally, U.S. Pat. No. 5,235,633 (Dennison et al.) provides a method for hand-off that uses mobile station location information instead of the conventional uplink or downlink signal quality information discussed above. In the technique of Dennison, a GPS receiver is used for determining the exact mobile station location. The mobile station relays the GPS location information to the mobile switching center, which then uses this location information, in conjunction with a look-up table that specifies cell boundary points, to determine when hand-off should be initiated and to select the most appropriate target cell for hand-off. In addition to the GPS positioning method of Dennison, various other techniques are known in the art for determining mobile station position, such as, for example, the technique disclosed in European Patent Application EP 0800319A1.

Though not specifically described in Dennison, a number of conventional location techniques can be used to determine cell boundary points or hand-off borders. These techniques use a test mobile that measures signal strength while driving between two base stations (6 and 7, FIG. 1). In one such technique, called handoff based on best server criteria, the handoff border has been reached, and the location can be noted, when the signal strength from the candidate base station 7 is equal to the signal strength from the serving base station 6. This border can be confirmed by doing the same test while driving in the opposite direction.

In another technique there will be a difference between incoming and outgoing handoff borders, called handoff hysteresis. Hand-off hysteresis is used to avoid oscillating hand-offs which can occur for a mobile driving at the border of two adjoining cells. In a hand-off technique based on hysteresis criteria, the outgoing hand-off border of the cell associated with a first base station is located when the signal strength from a second base station in an adjoining cell is greater than the signal strength from the first base station plus a predefined threshold value:

$$SS_2 > SS_1 + th_{val}$$

Similarly, to determine the incoming hand-off border for the first base station, signal strength is measured while driving in the opposite direction from the second base station to the first base station. The location of the incoming hand-off border is determined when the signal strength from the first base station is greater than the signal strength from the second base station plus a predefined threshold value:

$$SS_1 > SS_2 + th_{val}$$

Using either of the above conventional techniques, a network hand-off border map can be manually constructed from the collected test mobile data.

The hand-off border location monitoring discussed above is conventionally accomplished through performance of drive tests by network operator staff. To perform this monitoring, operator staff drive throughout the network and conduct and record call quality checks and handover positions. A conventional system such as TEMS (Test Mobile System) is used to perform the monitoring. TEMS uses mobiles modified with specialized software for monitoring parameters of the radio environment. Radio environment monitoring is initiated by an operator who connects the modified mobile to a personal computer via a standard RS-232 serial connection. A GPS receiver is also connected to the PC to provide mobile position information. Survey data is then compiled during the monitoring process including data such as the geographic locations associated with signal strengths, bit error rates, interference, dropped calls, or handovers. Post-processing of the data gathered by TEMS is performed in a geographical information system (GIS) that enables the operator to visualize survey data with different colors and symbols that are indicative of status and operation of the mobile.

Network mapping achieved through TEMS surveying, for example, is used for more than just providing a basis for hand-off decisions such as that shown in Dennison. Manually collected hand-off border information is also used for network maintenance and cell planning purposes. Thus, if a survey of hand-off border information indicates hand-off problems in certain areas of the network, network maintenance can be initiated to correct the problem. Additionally, consistent hand-off failures may indicate the need for additional, appropriately located base stations. Also, network hand-off border data is useful for long term strategic positioning of base stations in a network. By knowing the extent of current cell borders, determinations can be made as to the positioning of future base stations so as to provide adequate service to expected future users.

The conventional network mapping techniques discussed above (e.g., TEMS), however, are deficient for a number of reasons. First, the network map data must be laboriously collected in a manual fashion, requiring an inordinate amount of time and resources. Furthermore, over time, actual hand-off borders can vary from the stored hand-off borders due to changes in the radio environment, such as the construction or destruction of natural or man-made structures. These variations in the actual hand-off borders can impede adequate cell planning if not accounted for. Variations in the hand-off borders can also cause hand-off failures in systems such as Dennison, for example, if the actual cell border deviates significantly from the stored hand-off border since updated border data is not immediately accessible to the network.

Accordingly, it would be desirable to provide a technique for constructing a network map that is performed in an automatic fashion and is capable of adapting to changes in the radio environment.

SUMMARY

These desirable characteristics and others are provided by the following exemplary embodiments of the invention.

According to one exemplary embodiment of the invention a method of generating a map of cell hand-off borders associated with base stations in a radiocommunications network is provided. The method of this exemplary embodiment comprises the steps of: a) performing a map initialization phase using a first technique, wherein said initialization phase is initiated by said network; and b) performing a map maintenance phase using a second technique.

According to a second exemplary embodiment of the invention a method of maintaining a map of cell hand-off borders associated with base stations in a radiocommunications network is provided. The method of this exemplary embodiment comprises the steps of: a) initiating a hand-off request associated with a first mobile station b) selectively verifying downlink and/or uplink signal quality of said first mobile station to produce a verification result; c) based on said verification result, performing the steps of: i) initiating positioning requests from said network based on hand-off requests associated with subsequent mobile stations; ii) providing location data of said subsequent mobile stations based on said positioning requests; iii) constructing data representations indicating the locations of said subsequent mobile stations; iv) selectively repeating steps i) through iv) to construct a map of hand-off borders of a cell pair associated with the location of said first mobile station.

According to a third exemplary embodiment of the invention a method of maintaining a map of cell hand-off borders associated with base stations in a radiocommunications network is provided. The method of this exemplary embodiment comprises the steps of: a) initiating a hand-off request associated with a first mobile station; b) selectively verifying a location of said first mobile station to produce a verification result; c) based on said verification result, performing the steps of: i) initiating positioning requests from said network based on hand-off requests associated with subsequent mobile stations; ii) providing location data of said subsequent mobile stations based on said positioning requests; iii) constructing data representations indicating the locations of said subsequent mobile stations; iv) selectively repeating steps i) through iv) to construct a map of hand-off borders of a cell pair associated with the location of said first mobile station.

According to a fourth exemplary embodiment of the invention a system for generating a map of cell hand-off borders associated with base stations in a radioconimunications network is provided. The system of this exemplary embodiment comprises: means for performing a map initialization phase using a first technique, wherein said initialization phase is initiated by said network; and means for performing a map maintenance phase using a second technique.

According to a fifth exemplary embodiment of the invention a system for maintaining a map of cell hand-off borders associated with base stations in a radiocommunications network is provided. The system of this exemplary embodiment comprises: means for initiating a hand-off request associated with a first mobile station; means for selectively verifying downlink and/or uplink signal quality associated with said first mobile station to produce a verification result; and means for constructing a map of hand-off borders of a cell pair associated with the location of said first mobile station, based on said verification result.

According to a sixth exemplary embodiment of the invention a system for maintaining a map of cell hand-off borders associated with base stations in a radiocommunications network is provided. The system of this exemplary embodiment comprises: means for initiating a hand-off request associated with a first mobile station; means for selectively verifying a location associated with said first mobile station to produce a verification result; and means for constructing a map of hand-off borders of a cell pair associated with the location of said first mobile station, based on said verification result.

BRIEF DESCRIPTION OF THE DRAWINGS

The objects and advantages of the invention will be understood by reading the following detailed description in conjunction with the drawings in which.

DETAILED DESCRIPTION

Figure 1:
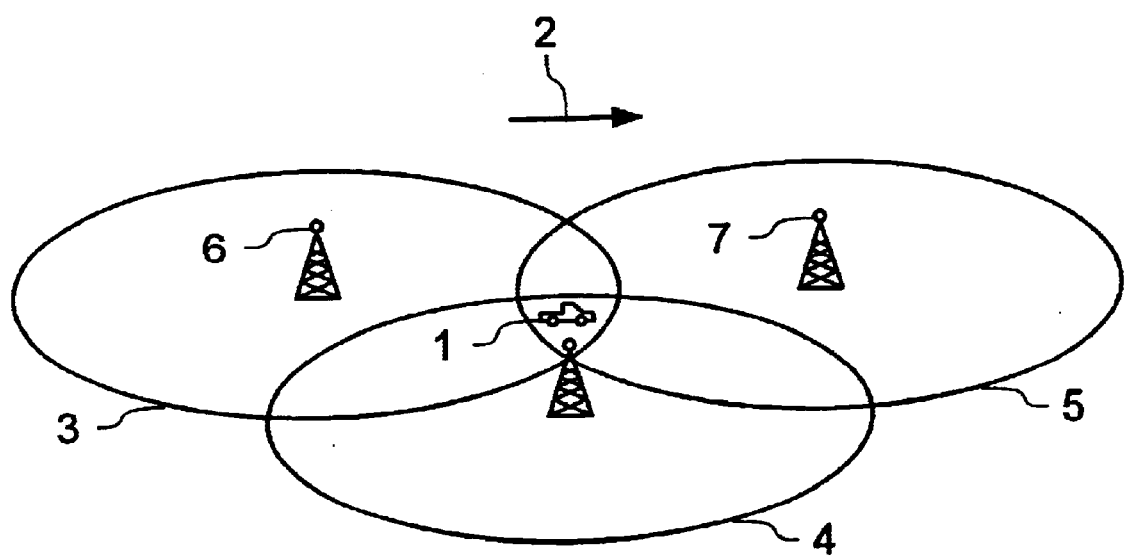
FIG. 1 is a diagram of a mobile station traversing three overlapping cells.
Figure 2:
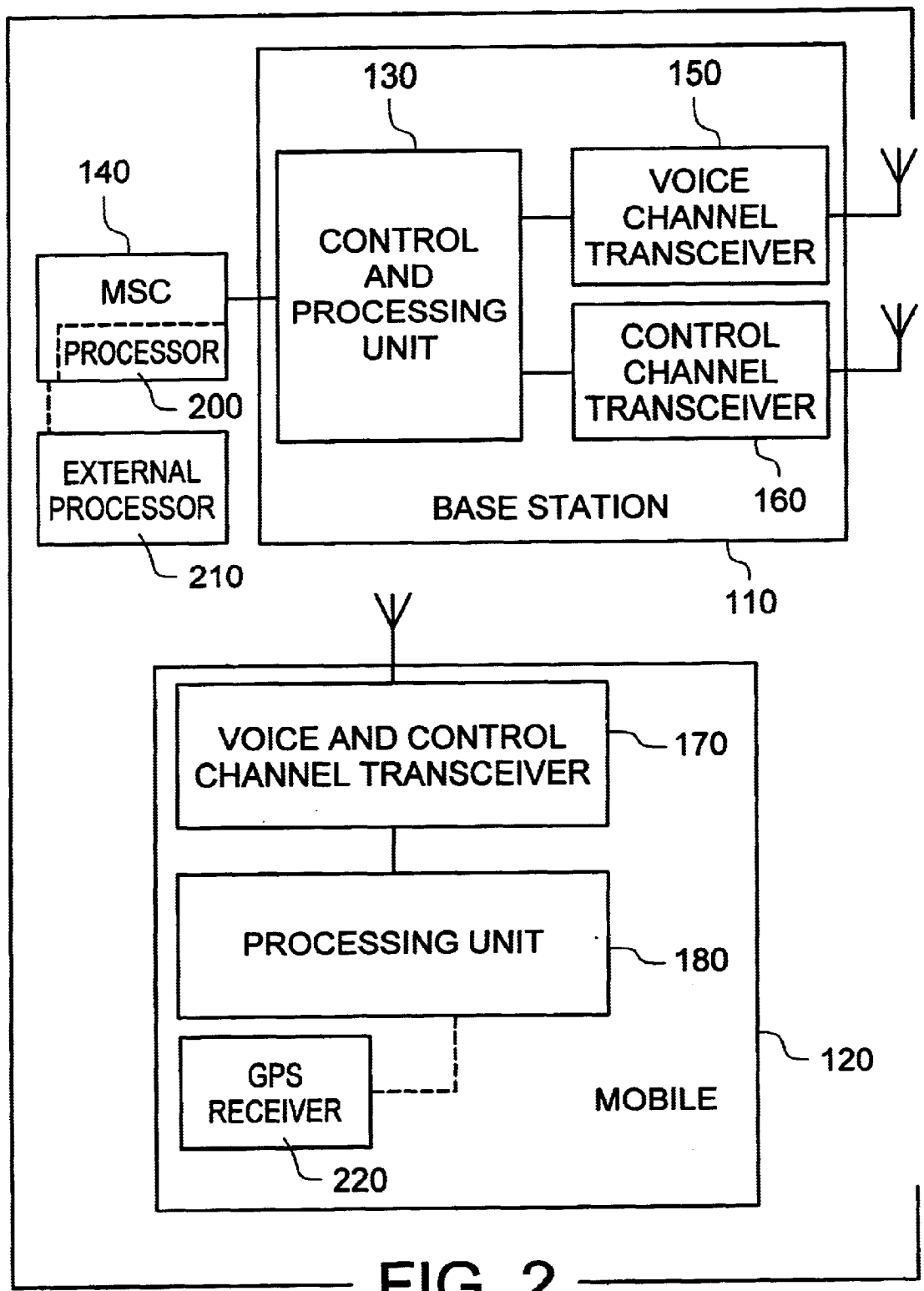
FIG. 2 represents an exemplary implementation of an apparatus for a cellular communications system according to the present invention.

To provide some context within which to describe the present invention consider FIG. 2, which represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System" and U.S. Pat. No. 5,745,523, entitled "Multi-mode Signal Processing," both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 broadcasts control information over the control channel of the base station or cell to mobiles locked to that control channel. It will be understood that the transceivers 150 and 160 can be implemented as a single device, like the voice and control transceiver 170, for use with digital control channels (DCCHs) and digital traffic channels (DTCs) that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

In accordance with an exemplary embodiment of the invention, shown in FIG. 2, mobile station position update information is provided to a switch 140 and then to a processor 200, 210 This position update information can be calculated in any desired. manner. For example, the processor can use signal strength measurements from three or more base stations to triangulate the mobile station's position or the position can be derived from a GPS receiver 220 located in the mobile station receiver 120. Any other locating technique can also be used, for example those described in U.S. Pat. No. 6,040,800 entitled "Systems and Methods for Locating Remote Terminals in Radiocommunication Systems", the disclosure of which is incorporated herein by reference. If GPS is used to report the mobile station location, the mobile station can transmit position update information ("mobile position report") to the base station 110 in a regular message such as, for example, a conventional IS136 RQL radio quality message which is transmitted at approximately every two seconds. If the network performs the mobile station positioning, the position data will be available at the base station and no location data will be required to be transmitted from the mobile station to the base station. The position update information can then be transferred to a processor 200, 210. The processor can be the switch processor 200 of the mobile switching center 140 or, attentively, can be an additional processor 210 external to the mobile switching center 140. Use of external processor 210 will advantageously permit the transfer of a significant amount of processing load from the switch processor 200 to the external processor.

The position update information, received at the processor 200, 210 and derived from any of the methods discussed above, can then be used to plot inter-cell hand-off borders into and out of each cell in accordance with a hand-off learning and recording technique of exemplary embodiments of the invention. Through implementation of the exemplary hand-off learning and recording technique, a network map can be constructed and stored in the processor memory using mobile station position reporting at hand-off requests. Using this technique, the mobile station positioning data is recorded for every cell in the network at the locations where hand-offs occur into and out of each cell using conventional hand-off mechanisms. These conventional hand-off mechanisms include determination of a hand-off border using best server or hysteresis criteria.

Figure 3:
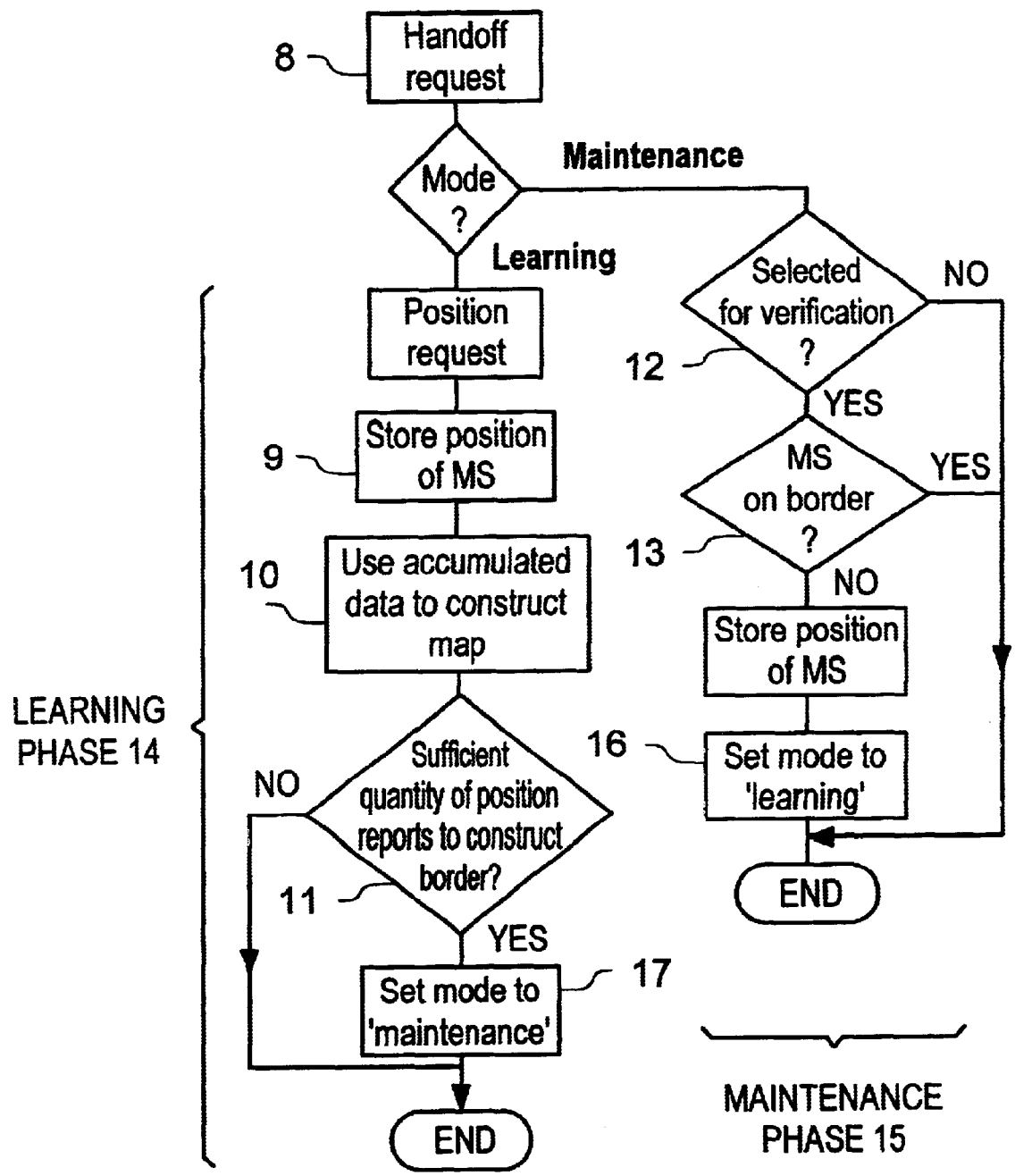
FIG. 3 illustrates a flow diagram of the hand-off learning and recording method of exemplary embodiments of the invention.

Exemplary embodiments of the present invention use a learning phase for constructing an initial network map and a maintenance phase for updating the map to correct for changes in the radio environment. FIG. 3 illustrates a flow diagram that broadly outlines the method steps in accordance with the exemplary embodiments of the present invention. During the learning phase 14, existing hand-off mechanisms in conjunction with mobile station position information are used to construct a network map in the switch or external processor. In one exemplary embodiment, "best server" based border identification is used. In this exemplary embodiment the mobile station requests hand-off when the downlink signal strength from the neighboring base station is equal to the downlink signal strength from the current serving base station. In this technique, the processor stores 9 the mobile station location at which the hand-off request 8 is made.

In the learning phase of another exemplary embodiment "hysteresis" based cell border identification is used. In this technique the outgoing hand-off border is identified by determining and storing 9 the mobile station location where the current base station downlink signal strength decreases to a level at which a hand-off request 8 is initiated. The incoming hand-off border is similarly identified by determining and storing 9 the mobile station location at which a hand-off request 8 is initiated into the cell from a border cell.

Using either the "best server" or "hysteresis" criteria, a compilation of border location data is constructed in the processor memory. Over a sufficient period of time, the compiled border location data 10 will represent a complete "picture" of the ingoing and outgoing hand-off borders for every cell in the network. When a sufficient amount of border data has been accumulated 11, the cell borders of the network will be accurately known and the existing handoff mechanisms can be discarded. The system can then rely on mobile station location information for hand-off determinations instead of signal strength measurements.

After completion of the learning phase, another exemplary embodiment of the invention implements 17 a maintenance phase 15 for verifying the accuracy of the cell borders maintained in memory. This maintenance mode is advantageous in that hand-off borders may change as a result of changes in the radio environment and the maintenance mode will automatically detect and correct for these cell border variations. In the maintenance mode, a specified percentage of hand-offs will be selected for verification 12 to determine whether the mobile station is actually located at the cell border 13. This determination is achieved using both the signal quality of the uplink or downlink and the position of the mobile station.

In a system where hand-off is initiated based on signal quality measurements (e.g., signal strength), the network map is consulted in the maintenance mode to verify that the stored hand-off border data coincides with the current position of the mobile station. If the two do not coincide, the system would initiate 16 a learning phase for the particular cell pair associated with the hand-off request until the border has been identified. In a system where hand-off is initiated based on mobile station position, the associated uplink or downlink signal quality is checked at the recorded hand-off border to verify that the signal quality has decreased to the point where hand-off is required. If the signal quality is sufficient to maintain the call, or if the signal quality goes below a specified level such that a possible change in the radio environment is indicated, the system would initiate 16 a learning mode 14 for the particular cell pair associated with the hand-off request until the border has been identified.

Thus, the hand-off learning and recording technique of the exemplary embodiments of the invention accumulates hand-off positioning data from numerous mobile stations over time and constructs and records a network map. Implementation of these exemplary techniques advantageously permits the construction of a network map that details accurate cell hand-off borders and which is automatically revised to account for changes in the radio environment.

Although a number of embodiments are described herein for purposes of illustration, these embodiments are not meant to be limiting. Those skilled in the art will recognize modifications that can be made in the illustrated embodiment. Such modifications are meant to be covered by the spirit and scope of the appended claims.

What is claimed is:

1. A method of generating a map of cell hand-off borders associated with base stations in a radiocommunications network, said method including a map initialization phase comprising the steps of:
   a) initiating positioning requests from the network based on hand-off requests associated with mobile stations;
   b) providing locations of each of the mobile stations based on the positioning requests;
   c) constructing data representations indicating the locations of each of the mobile stations; and
   d) selectively repeating steps a) through c) to construct a map of handoff borders associated with base stations located throughout at least a portion of the network.

2. The method of claim 1, further comprising a map maintenance phase comprising the steps of:
   a) initiating a hand-off request associated with a first mobile station; and
   b) selectively verifying uplink, downlink or both uplink and downlink signal qualities of said first mobile station to produce a verification result; and
   c) based on said verification result, performing the steps of:
      i) initiating positioning requests from said network based on hand-off requests associated with subsequent mobile stations;
      ii) providing location data of said subsequent mobile stations based on said positioning requests;
      iii) constructing data representations indicating the locations of said subsequent mobile stations; and
      iv) selectively repeating steps i) through iv) to construct a map of hand-off borders of a cell pair associated with the location of said fist mobile station.

3. The method of claim 1, further comprising a map maintenance phase comprising the steps of:
   a) initiating a hand-off request associated with a first mobile station; and
   b) selectively verifying a location of said first mobile station to produce a verification result; and
   c) based on said verification result, performing the steps of:
      i) initiating positioning requests from said network based on hand-off requests associated with subsequent mobile stations;
      ii) providing location data of said subsequent mobile stations bases on said positioning requests;
      iii) constructing data representations indicating the locations of said subsequent mobile stations; and
      iv) selectively repeating steps i) through iv) to construct a map of hand-off borders of a cell pair associated with the location of said first mobile station.

4. A method of maintaining a map of cell hand-off borders associated with base stations in a radioconmmunications network, comprising the steps of:
   a) initiating a hand-off request associated with a first mobile station;
   b) selectively verifying downlink and/or uplink signal quality of said first mobile station to produce a verification result; and
   c) based on said verification result, performing the steps of:
      i) initiating positioning requests from said network based on hand-off requests associated with subsequent mobile stations;
      ii) providing location data of said subsequent mobile stations based on said positioning requests;
      iii) constructing data representations indicating the locations of said subsequent mobile stations;
      iv) selectively repeating steps i) through iv) to construct a map of hand-off borders of a cell pair associated with the location of said first mobile station.

5. A method of maintaining a map of cell hand-off borders associated with base stations in a radiocommunications network, comprising the steps of:
   a) initiating a hand-off request associated with a first mobile station;
   b) selectively verifying a location of said first mobile station to produce a verification result; and
   c) based on said verification result, performing the steps of:
      i) initiating positioning requests from said network based on hand-off requests associated with subsequent mobile stations;
      ii) providing location data of said subsequent mobile stations based on said positioning requests;
      iii) constructing data representations indicating the locations of said subsequent mobile stations;
      iv) selectively repeating steps i) through iv) to construct a map of hand-off borders of a cell pair associated with the location of said first mobile station.

6. A system for generating a map of cell hand-off borders associated with base stations in a radiocommunications network, aid system comprising a means for performing a map initialization phase comprising:
   means for initiating positioning requests from said network based on hand-off requests associated with mobile stations;
   means for providing locations of each of said mobile stations based on said positioning requests;
   means for constructing data representations indicating the locations of each said mobile stations; and
   means for constructing a map of hand-off borders associated with base stations located throughout at least a portion of said network using said constructed data representations.

7. The system of claim 6, further comprising means for performing map maintenance comprising:
   means for initiating a hand-off request associated with a first mobile station;

means for selectively verifying downlink and/or uplink signal quality associated with said first mobile station to produce a verification result; and means for constructing a map of hand-off borders of a cell pair associated with the location of said first mobile station, based on said verification result.

8. The system of claim 6, further comprising means for performing map maintenance comprising:

means for initialing a hand-off request associated with a first mobile station;

means for selectively verifying a location associated with said first mobile station to produce a verification result; and means for constructing a map of hand-off borders of a cell pair associated with the location of said first mobile station, based on said verification result.

9. A system for maintaining a map of cell hand-off borders associated with base stations in a radiocommunications network comprising:

means for initiating a hand-off request associated with a first mobile station;

means for selectively verifying downlink and/or uplink signal quality associated with said first mobile station to produce a verification result; and means for constructing a map of hand-off borders of a cell pair associated with the location of said first mobile station, based on said verification result.

10. A system for maintaining a map of cell hand-off borders associated with base stations in a radiocommunications network comprising:

means for initiating a hand-off request associated with a first mobile station;

means for selectively verifying a location associated with said first mobile station to produce a verification result; and means for constructing a map of hand-off borders of a cell pair associated with the location of said first mobile station, based on said verification result.

11. A method of generating a map of cell handoff borders associated with base stations in a radio communications network comprising:

a) initiating positioning requests based on hand-off requests from mobile stations;

b) receiving information regarding locations of each of the mobile stations based on the positioning requests;

c) constructing data representations indicating the locations of each of the mobile stations; and d) selectively repeating steps a) through c) to construct a map of hand-off borders associated with base stations located throughout at least a portion of the network.

12. The method of claim 11 further comprising:

e) initiating a hand-off bequest associated with a first mobile station; and f) selectively verifying uplink, downlink or both uplink and downlink signal qualities of the first mobile station to produce a verification result.

13. The method of claim 12 further comprising based on the verification result:

i) initiating positioning requests based on handoff requests associated with subsequent mobile stations;

ii) receiving location data of the subsequent mobile stations based on the positioning requests;

iii) constructing data representations indicating the locations of the subsequent mobile stations; and iv) selectively repeating i) through iii) to update the map with handoff borders of a cell pair associated with the location of the first mobile station.

14. The method of claim 11 further comprising:

e) initiating a hand-off request associated with a first mobile station; and f) selectively verifying location of the first mobile station to produce a verification result.

15. The method of claim 14 further comprising based on the verification result;

i) initiating positioning requests based on handoff requests associated with subsequent mobile stations;

ii) receiving location data of the subsequent mobile stations based on the positioning requests;

iii) constructing data representations indicating the locations of the subsequent mobile stations; and iv) selectively repeating i) through iii) to update the map with hand-off borders of a cell pair associated with the location of the first mobile station.

16. A mobile switching center having at least one processor therein, said at least one processor being configured to:

a) initiate positioning requests based on hand-off requests from mobile stations;

b) receive information regarding locations of each of the mobile stations based on the positioning requests;

c) construct data representations indicating the locations of each of the mobile stations; and d) selectively repeat steps a) through c) to construct a map of handoff borders associated with base stations located throughout at least a portion of the network.

17. The mobile switching center of claim 16, wherein said at least one processor is further configured to:

e) initiate a hand-off request associated with a first mobile station; and f) selectively verify uplink, downlink or both uplink and downlink signal qualities of the first mobile station to produce a verification result.

18. The mobile switching center of claim 17, wherein based on the verification result said at least one processor is further configured to:

i) initiate positioning requests based on hand-off requests associated with subsequent mobile stations;

ii) receive location data of the subsequent mobile stations based on the positioning requests;

iii) construct data representations indicating the locations of the subsequent mobile stations; and iv) selectively repeat i) through iii) to update the map with hand-off borders of a cell pair associated with the location of the first mobile station.

19. The mobile switching center of claim 16, wherein said at least one processor is further configured to:

e) initiate a hand-off request associated with a first mobile station; and f) selectively verify location of the first mobile station to produce a verification result.

20. The mobile switching center of claim 19, wherein based on the verification result said at least one processor is further configured to:

i) initiate positioning requests based on hand-off requests associated with subsequent mobile stations;

ii) receive location data of the subsequent mobile stations based on the positioning requests;

iii) construct data representations indicating the locations of the subsequent mobile stations: and iv) selectively repeat i) through iii) to update the map with hand-off borders of a cell pair associated with the location of the first mobile station.

* * * * *